United States Patent [19]

Praamsma

[11] 4,240,738
[45] Dec. 23, 1980

[54] LIGHT MIXING SYSTEM FOR A PHOTOGRAPHIC ENLARGER

[75] Inventor: Michael F. Praamsma, Santa Monica, Calif.

[73] Assignee: Vivitar Corporation, Santa Monica, Calif.

[21] Appl. No.: 48,621

[22] Filed: Jun. 14, 1979

[51] Int. Cl.³ .................. G03B 27/76; G03B 27/72; G03B 27/00
[52] U.S. Cl. ................................. 355/1; 355/35; 355/71
[58] Field of Search ............... 355/1, 32, 35–38, 355/77, 67–71

[56] References Cited

U.S. PATENT DOCUMENTS

| | | | |
|---|---|---|---|
| 606,593 | 6/1898 | Stender | 355/67 |
| 2,327,818 | 8/1943 | Peterson | 355/67 |
| 3,184,753 | 5/1965 | Koster | 355/1 X |
| 3,273,451 | 9/1966 | Wilson | 355/35 X |
| 3,279,311 | 10/1966 | Lichtner | 355/71 |
| 3,492,070 | 1/1970 | Zahn | 355/37 |
| 3,561,867 | 2/1971 | Simmon | 355/67 |
| 3,756,712 | 9/1973 | Weisglass et al. | 355/32 X |
| 3,756,719 | 9/1973 | Harter | 355/67 |
| 3,880,520 | 4/1975 | Weisglass | 355/37 |
| 3,927,941 | 12/1975 | Yamaguchi | 355/71 |
| 4,131,362 | 12/1978 | Gandini | 355/71 |

FOREIGN PATENT DOCUMENTS

1522019  6/1969  Fed. Rep. of Germany ............. 355/71

*Primary Examiner*—Donald A. Griffin
*Attorney, Agent, or Firm*—Poms, Smith, Lande & Rose

[57] ABSTRACT

A light mixing system for use in a photographic enlarger in which light from a light source is admitted to a light mixing module through an aperture (and/or through a light modifying filter system for color correction for color enlargements) to mix light beams to provide substantially uniform energy distribution at the outlet port of the light mixing module. The light mixing module includes a lens having a conical surface to receive the admitted light beams and to direct the light beams along angular paths with respect to the axis of the conical surface. The lens interfaces with a diffuser means comprising a multitude of fiber optic elements each adapted to receive light beams along the angular path, to transmit and reflect the light beams and to cause the light beams to depart the exit end of the fiber optic element in the form of a fan or cone of substantially the same angle as that of the light beams at the lens for mixing said beams. A light guide means further mixes the exiting mixed light beams from the fiber optic diffuser and exits such beams into a frustoconical chamber having light reflecting and diffusing surfaces to provide an evenly distributed diffuse secondary light source of expanded areas.

14 Claims, 5 Drawing Figures

LIGHT MIXING SYSTEM FOR A PHOTOGRAPHIC ENLARGER

BACKGROUND OF INVENTION

Light emanating from light sources used with photographic enlargers is usually characterized by nonuniform, random energy distribution over a transverse planar area disposed perpendicularly to the axis of the light path. It is desired to provide light which is evenly distributed over such a transverse plane to the axis of the light path in order to uniformly illuminate a film negative being enlarged. Various constructions of light mixing devices have been proposed.

In one prior proposed light mixing device, light emanating from a light source is passed through a filter means into a conical light reflecting member having inner light diffusing surfaces which radially inwardly reflect, mix, and distribute the light rays over an expanded area where they are transmitted through a light diffusing plate. The plate is positioned above one end of a right cylinder mixing chamber provided with means within the chamber for distributing the mixed light to uniformly illuminate a film negative. See U.S. Pat. No. 3,927,941.

Other prior proposed light mixing devices have included a modified hollow sphere having internal diffusely reflecting surfaces provided with a light distributor in the form of a polygonal pyramid or cone for integrating light admitted through a relatively small window and exiting through a larger light exit window (U.S. Pat. No. 3,561,867); a mixing chamber employing a slanted light opaque ceiling and side walls (U.S. Pat. No. 3,756,712); a light integrator box provided with triangular shaped reflectors (U.S. Pat. No. 3,756,719); and an arrangement of light mixing tunnels and light guiding members with light dispersion elements (U.S. Pat. No. 3,492,070).

SUMMARY OF INVENTION

The present invention contemplates a light mixing system which may be embodied in a light mixing module readily assembled with other photographic enlarger modules for receiving light from a light source and for mixing said light in an effective efficient manner. The present invention contemplates a light mixing system which receives light through a reduced aperture and exits such light from an enlarged outlet opening of the mixing module with substantially uniform distribution of light energy over the enlarged outlet opening.

In the present invention light exiting from a light aperture or from a filter module impinges upon a lens having a conical light receiving surface for refraction of light beams impinging thereon at a selected angle to the axis of the light path through the mixing module. The lens means transmits such angular light beams to a fiber optic diffuser means comprising a multitude of fiber optic elements assembled in parallel relation and of relatively small length, such as 1/16". Light entering the fiber optic element is completely reflected as it passes through the element and exits from the fiber optic diffuser member in the form of a cone or fan of light beams having approximately the same angle as that of the light beams entering the fiber optic element. Light exiting from the fiber optic diffuser member is then guided by a light guide which provides additional reflection of the light beams to a diffuser member which transmits and exits diffused light into a frustoconical chamber to enlarge the area of the light transmitted to a selected area for providing a secondary light source of mixed light for a light diffusing module which may redistribute the light energy in order to compensate for fall off of light energy at peripheral margins of the light path.

It is, therefore, a primary object of the present invention to provide a light mixing system of novel construction and operation for use with a photographic enlarger.

An object of the present invention is to provide a light mixing system which employs a conical lens and a fiber optic diffuser means.

Another object of the invention is to provide a light mixing system as described above wherein light is mixed by a conical lens and a fiber optic diffuser means while traveling along a light path of selected diameter and wherein a light reflecting and diffusing chamber receives such light and expands the light path area to provide a substantially uniform distribution of light over a larger area for use as a secondary light emanating source for another component of the photographic enlarging system.

A still further object of the present invention is to provide a light mixing system to receive light from a light source by means of a conical lens means to impart a selected angle to light beams so received and to provide means interfacing with said conical lens means to efficiently mix light departing from the diffuser means in the form of a progressively expanding light pattern which extensively intermixes with other departing light beams of similar form to accomplish efficient light mixing in a relatively short distance along the light path.

A specific object of the present invention is to provide a light mixing system which includes a light mixing member of transparent material provided with a conical hollow for reflecting a portion of the light departing a fiber optic diffusing member.

Further objects and advantages of the present invention will be readily apparent from the following description of the drawings in which exemplary embodiments of the invention are shown.

Figure 1:
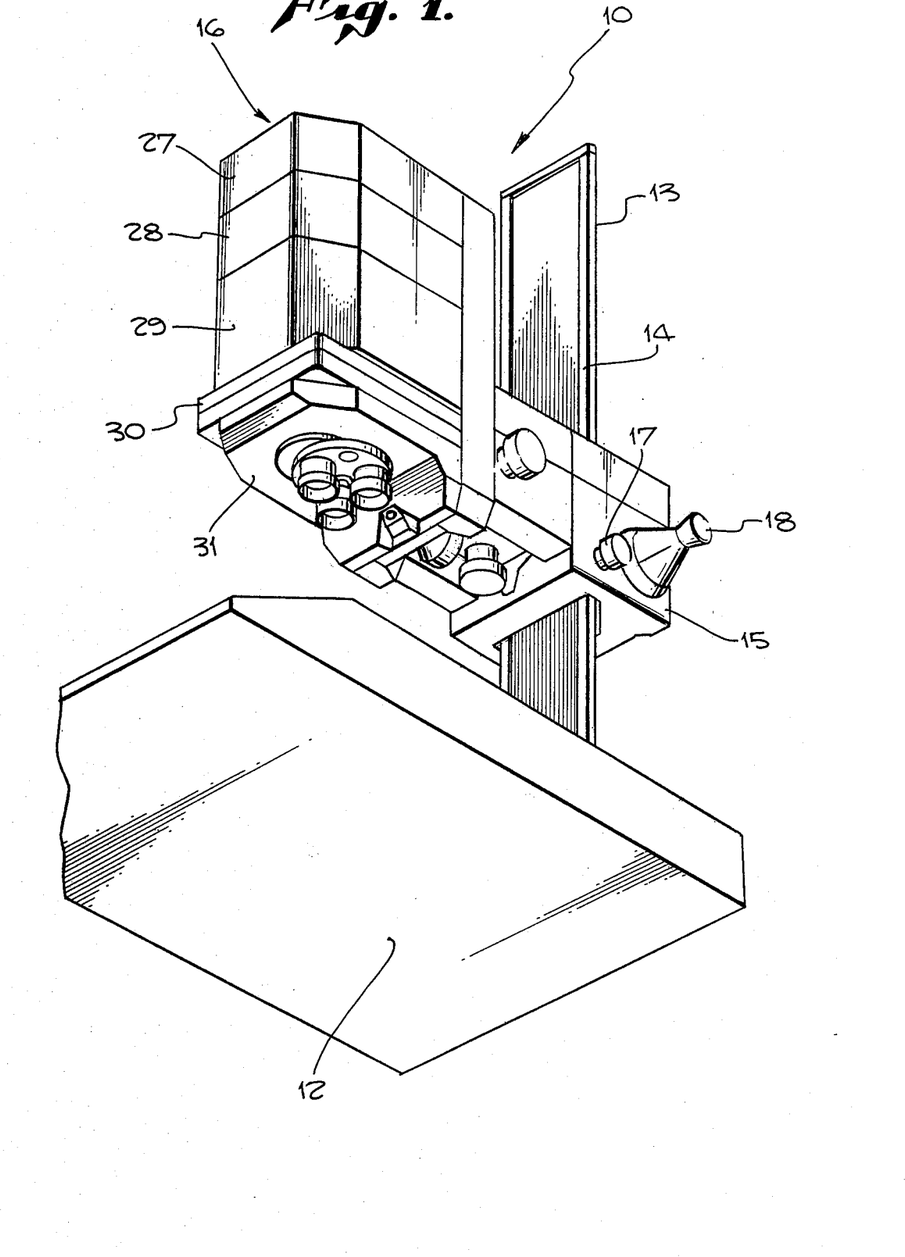
FIG. 1 is a perspective view of a photographic enlarger having a construction adapted to utilize the light mixing system of this invention.

In FIG. 1 there is generally shown an exemplary photographic enlarger generally indicated at 10 which may incorporate light mixing means of this invention. Photographic enlarger 10 generally comprises a base 12 provided with an upstanding rigid support column 13 provided with suitable track means 14 for cooperation with a carriage 15 adapted to travel along track means 14 for adjusting the vertical height of an enlarger assembly generally indicated at 16. Carriage 15 is provided with a suitable crank means 18 for moving carriage means 15 along the support column and with lock means 17 for locking the carriage means 15 in a selected position. It will be understood that the carriage means may be adjustably moved along column 13 by manual actuation, electrically driven actuation, or by suitable computer controlled means.

Figure 2:
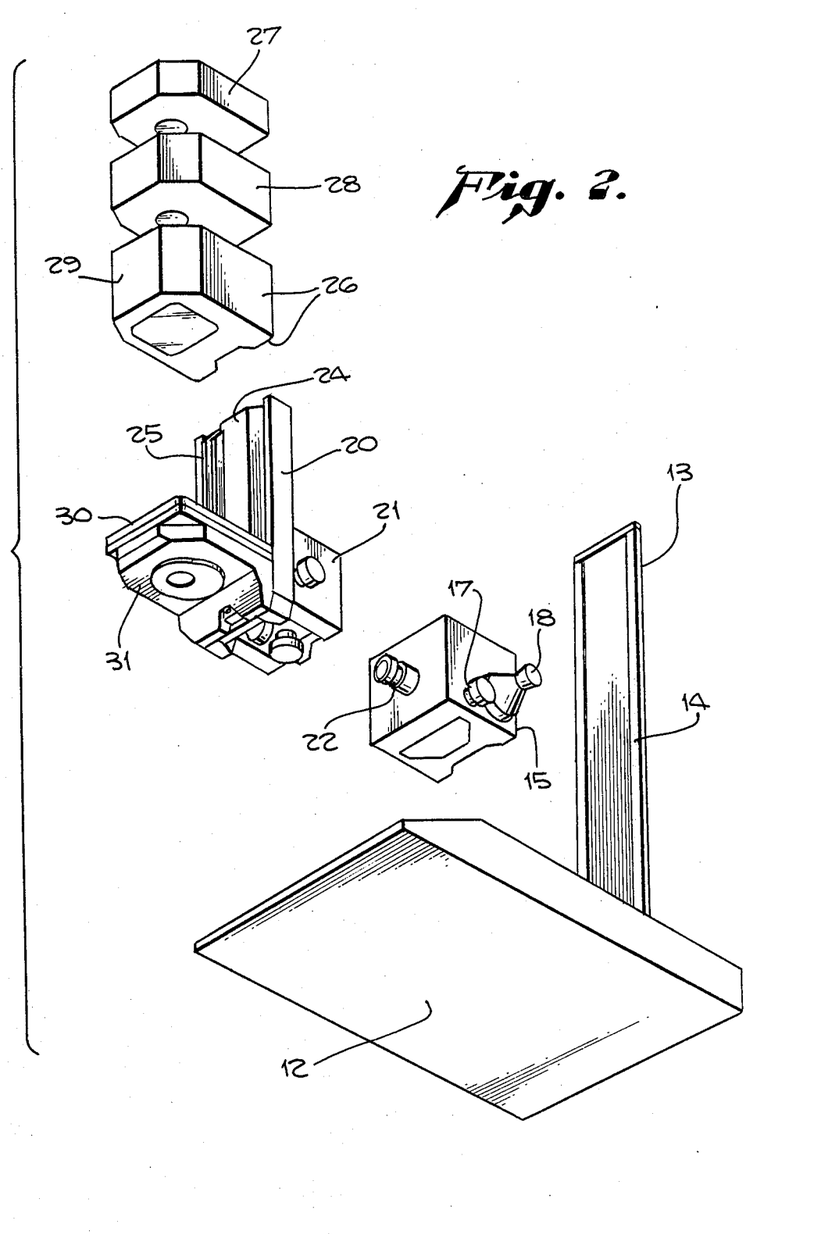
FIG. 2 is an exploded perspective view of the photographic enlarger shown in FIG. 1.

Enlarger assembly 16 may comprise a chassis means 20 cooperably connected to carriage 15 by connecting means 21 which may be provided suitable pivotal movement about a horizontal axis by a pivot member 22 extending from carriage 15. Chassis means 20 may be disposed generally parallel to support column 13 and provides on its outwardly directed face 24 suitable groove means 25 for cooperation with complementary engagement means provided one each of several modules 27, 28 and 29, for example, selected for use in a photographic enlarging process. Chassis 20 also may support a carrier means 30 for holding a film negative from which an enlargement is to be made. Chassis 20 74also supports a suitable lens carrier 31 to which may be attached selected enlarger lens means. If desired, but not shown, a bellows system may be supported by the chassis between the lens carrier means and the film negative carrier. Suitable means are provided for adjustment and securement of the several modules on the chassis, such means not being shown because they do not form part of this invention.

Modules 27, 28 and 29 are exemplary; module 27 may comprise a suitable light source; module 28 a suitable filter assembly including a light mixing system embodying this invention; and module 29 a light diffusing means.

Figure 3:
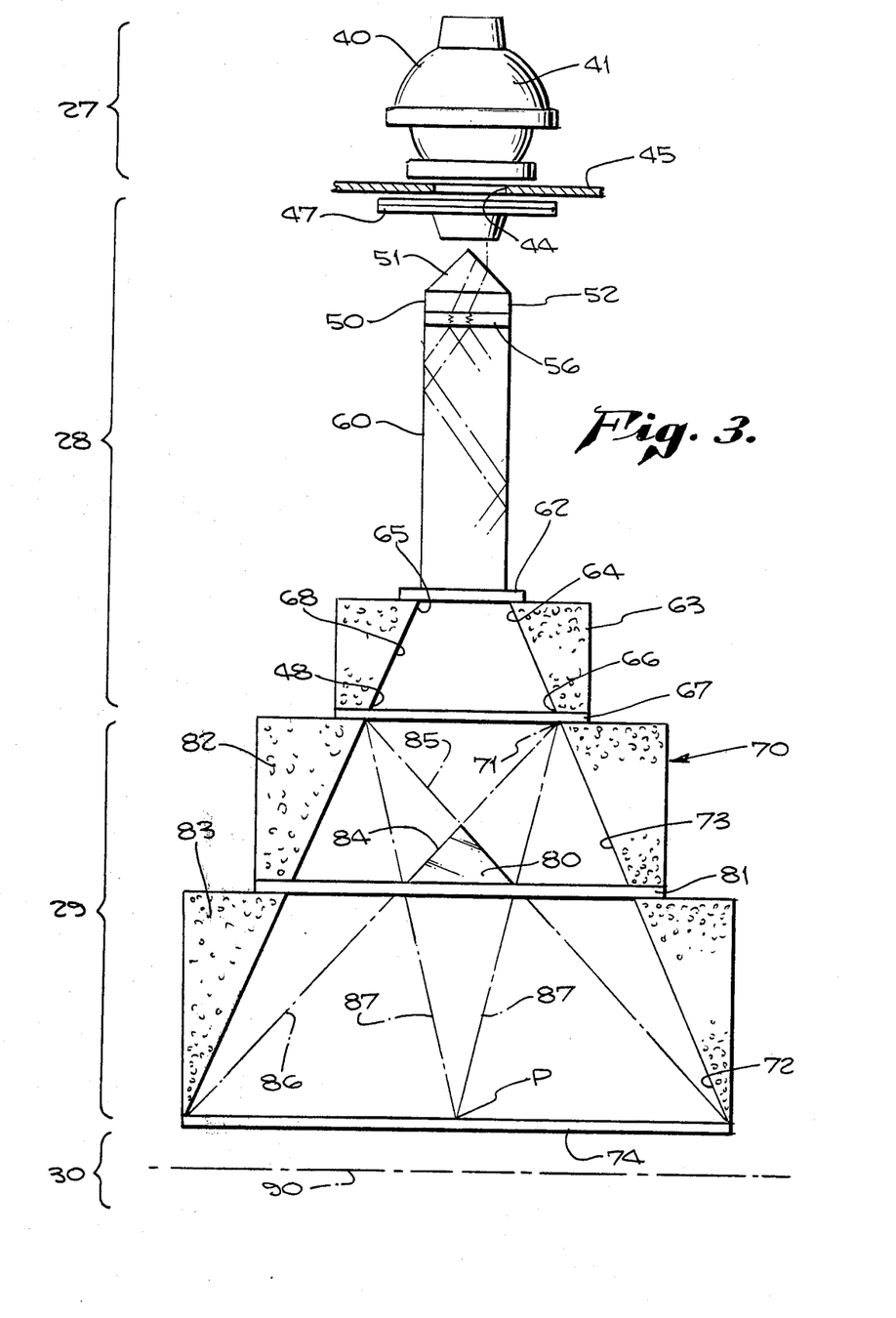
FIG. 3 is a schematic view of the enlarger modules shown in FIG. 1 and illustrating the light mixing system of this invention.

In FIG. 3 modules 27, 28 and 29 are schematically illustrated in order to better show and explain the novel light mixing system of this invention and diffusing of light from the light source in order to provide a desired light energy distribution at the plane of the film negative held by the negative carrier 30. The light diffusing means is described and claimed in copending patent application Ser. No. 48,622 filed June 14, 1979, owned by a common assignee.

Light source 40 may comprise a lamp means of well-known manufacture, as for example a tungsten halogen quartz lamp of 300 watts and suitable voltage. The lamp housing 41 may include an internal reflective surface to direct its light beams through a light transmitting and heat reflecting mirror 43 before being transmitted through an aperture 44 provided in a suitable aperture plate 45 carried by module 27.

Light passing through aperture 44 may be modified by a suitable selected filter means 47 at the entrance to module 28 which serves as a light mixing means. Filter means 47, for the purposes of this description, may be any suitable filter arrangement for modifying or correcting the color components of the light emanating from the light source 40. Filter means 47 may include the construction and operation of a filter means providing additive subtractive color modification.

Light, which leaves the exit side of the filter means 47, is comprised of light beams which have nonuniform random energy distribution over the exit side of the filter means. Module 28 embodying this invention serves to mix such light so that when the light reaches the exit port 48 of the light mixing module 28 the energy distribution including intensity and color of such light will be substantially uniform across the area of the exit or outlet port of the mixing module 28.

Light mixing module 28 further includes an axicon lens 50 below the filter means 47 and located along the optical light path of light passing through the filter means. Axicon lens 50 comprises a conical lens surface 51, in this example having a conical angle of approximately 45 degrees of the axis of the light path. The conical portion of lens 50 may be integral with a cylindrical portion 52 of lens 50, the cylindrical portion facilitating handling and mounting of the axicon lens. Uncollimated light beams, which exit from filter means 47, are refracted by the conical lens surface 51 so that substantially all of the light beams refracted thereby are directed through the axicon lens 50 at a nonzero angle to the axis of the light path. At the exit face 53 of axicon lens 50 and interfacing therewith is a fiber optic diffuser means 56 to receive such exiting light beams at an angle.

Fiber optic diffuser means 56 comprises a multitude of high density light transmitting optical fibers each cladded with a suitable coating to provide complete and multiple reflection of light beams along the length of the optical fiber. Such fibers, such as fiber 57 in FIG. 4, receive light at a selected range of angles in order to provide complete reflection of the light beam therethrough and to exit such light in a fan shaped or conical fan pattern as schematically indicated at 58. Exemplary optical fibers may be from 5 to 10 microns in diameter, the fibers being very tightly assembled in parallel and fused at their cladding. An exemplary thickness of diffuser means 56 may be 1/16 inches. One of the characteristics of such an optical fiber is that reflection of a light beam entering a fiber 57 at a selected angle of between 30 to 40 degrees will be completely reflected and will emanate and depart from the exit port of the fiber at virtually the same angle at which it entered the fiber.

Figure 4:
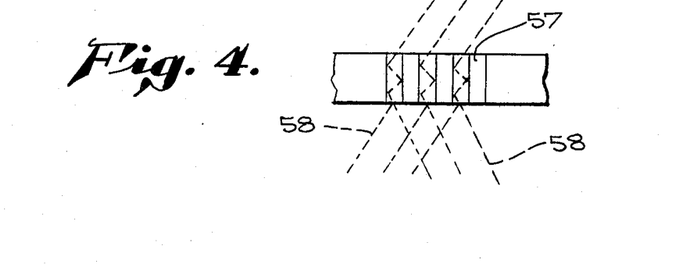
FIG. 4 is a fragmentary schematic view of a fiber optic diffuser disk member utilized in the mixing system of this invention.

Thus, the axicon lens which receives light beams on its conical surface will transmit such light beams at an angle for entrance into the optical fiber 57 at a selected angle and will be transmitted therefrom at virtually the same angle and in the form of an outwardly expanding fan shaped cone which provides intimate mixing and dispersion of light departing the exit face of the fiber optic diffuser means 56. It is estimated that approximately 90% of the mixing of light received from the filter means 47 is accomplished at the axicon lens and fiber optic diffuser means by such overlapping of the outwardly expanding fan shaped or conical shaped pattern of the light beams as they depart the exit face of the diffuser disk 56. Effective major mixing of light received from the filter means 47 thus occurs in a relatively short axial distance.

Light which exits from diffuser means 56 may then be transmitted along a cylindrical light guide 60 which may be made of a suitable transparent acrylic plastic. Light guide 60 need not be cladded and causes further mixing of the light beams as they are reflected and travel along the length of the light guide. The light guide 60 may be any selected length.

Light transmitted from the exit face of light guide 60 is passed through a diffuser disk 62 which may be of conventional plastic or ground glass and which further scatters the light received.

Light mixing module 28 also comprises a body member 63 provided with a frustoconical chamber 64 having an inlet opening 65 to receive mixed and scattered light from diffuser disk 62. The frustoconical chamber 64 permits expansion of the light 74beams to an extended area at exit port 66 of chamber 65, the exit port being provided with another diffusion disk 67 of conventional form. In this example, light entering the inlet port 65 is transmitted through a port of approximately 1 inch in diameter and the light is expanded at the exit port 66 to approximately 2¼ inches in diameter in this example. Expansion of the light beams at the end of light mixing module 28 provides an extended area secondary light source for the enlarger lens (not shown) or for light diffusing module 29.

Body member 63 may be made of a white Styrofoam of selected cellular size for providing a chamber surface 68 which not only reflects light but also serves to further diffuse the light. It is estimated that light passing through the extended area diffusion disk 67 is about 99% mixed.

Light diffusing module 29 receives light departing from the light mixing module 28 and further distributes the light so that the light intensity at the outlet or exit side of the light diffusing module 29 has a selected light energy distribution, particularly at the peripheral margins of its exit port.

Light diffusing module 29 may comprise a diffuser body member 70 having a light inlet opening 71 and a light outlet opening or port 72 of enlarged area as compared with the inlet opening 71 as for example 2¼" compared to 6.4. Body member 70 includes an internal light reflecting chamber 73 of frustoconical form extending between said inlet and outlet light openings 71 and 72. Body member 70 may be made of white cellular Styrofoam the same as body member 63 of the light mixing module 28. The frustroconical chamber 73 is of the same conical angle as frustoconical chamber 64 and is an extension thereof. The interior Styrofoam surfaces of chamber 73 provide light reflecting and diffusing characteristics for further mixing and diffusing of the light.

The diffusing disk 67 is provided at the inlet opening 71 of the chamber 73 and a light diffusing disk 74 is provided at the outlet port 72.

Means for regulating the amount of light intensity distributed from the axis of the light path in a radial direction towards the peripheral margins of the enlarged light outlet opening 72 is provided by a light reflecting conical member 80 positioned in spaced relation to the inlet and outlet openings 71, 72 and coaxial with the axis of the light path of the light beams. Conical member 80 may be suitably supported in chamber 73 upon a transparent thin glass plate 81 suitably mounted between upper and lower body portions 82 and 83 of body member 70.

Conical member 80 is provided with highly reflective silvered conical surfaces 84 to reflect the central portion of light entering chamber 73 to the reflective and diffusing surfaces 75 and 76 of chamber 73 on body portions 82, 83. The location of conical member 80 and the conical angle of the member are of importance in determining the energy distribution of light at the peripheral margins of the outlet opening 72. The relationship of the frustoconical chamber 73 to the location and shape of the conical member 80 may be determined by generating conical surface 84 by drawing diagonal lines 85 and 86 extending from edges of inlet opening 71 to a diametrically opposite edge point on the outlet opening 72. The base of the cone so determined is located by viewing the conical member 80 from a point P on the axis of the system at the outlet opening 72 so that the conical member 80 may be located where the base of the cone will fully eclipse the inlet opening 71. Such eclipse lines are indicated by lines 87. As a result of determining the shape of conical member 80 as above indicated and locating it along the axis of the light path, it will be apparent that light entering inlet opening 71 will not cross the axial point P at the outlet opening 72 and that the central portion of light entering inlet opening 71 will be reflected radially outwardly by the conical member 80 to the light reflecting and diffusing walls 75 and 76 of the upper and lower body portions 82, 83 and thus be distributed over outlet diffuser plate 74 in a pattern in which the energy of light distributed at the peripheral margins of the outlet opening 72 is enhanced and the energy distribution of light over the major central portion of opening 72 is substantially uniform.

Diffused light exiting from outlet opening 72 of the diffuser module 29 virtually uniformly illuminates the film negative at plane 90 on which a film negative may be positioned by the film carrier module 30. In addition, peripheral margins of outlet opening 72 have enhanced light energy distribution in order to compensate for the cosine 4 fall off of the enlarger lens so that light incident upon the plane at which the print paper is located essentially uniform over the entire area of the print plane (not shown). It will thus be readily apparent that the light diffusing module 29 described above which has received modified or color corrected substantially mixed light from the light mixing module 28 has transmitted such light and expanded the area of such light so that it is virtually uniformly distributed in terms of light energy over the film negative plane and thereby provides a uniform exposure of print paper at the print plane.

It will be understood that the conical angle of cone member 80 may be slightly varied in order to regulate or modify the distribution of light energy at the peripheral margins. Modifying the conical angle of conical member 80 will not effect the eclipse function of the base of the conical member 80. Thus, distribution of light energy at the peripheral margins may be somewhat varied without modifying the uniform distribution of light energy radially inwardly of said margins.

Figure 5:
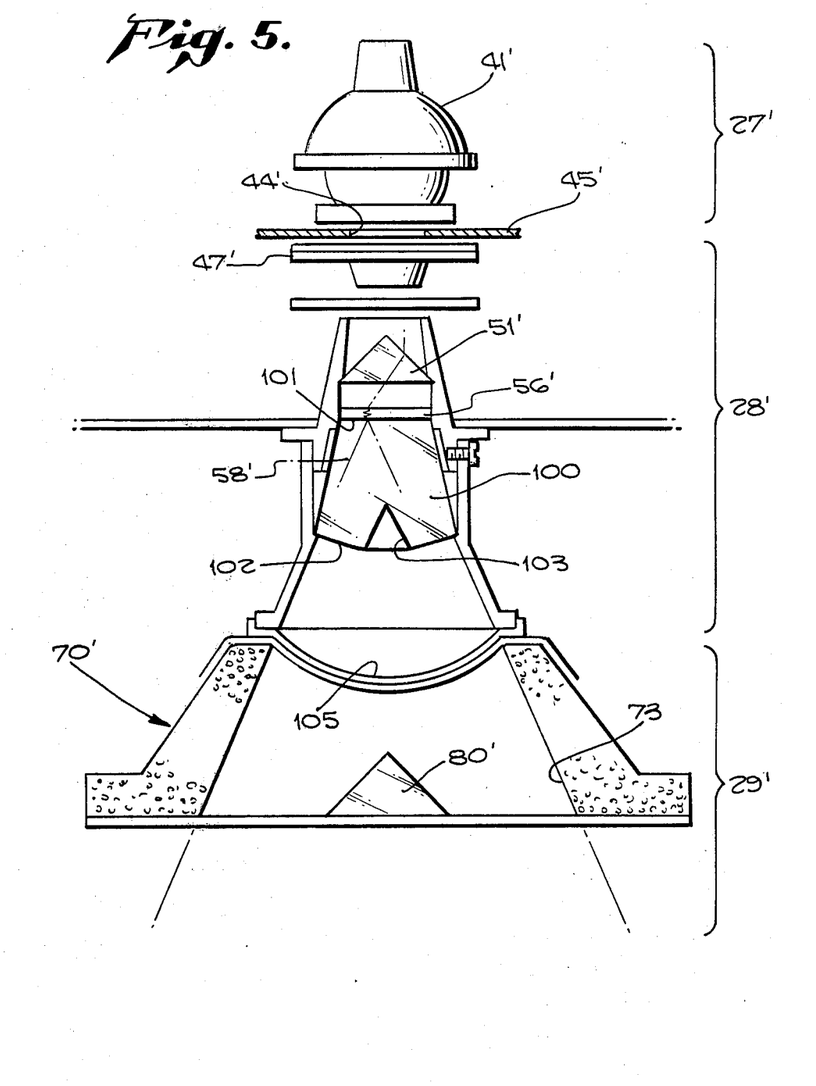
FIG. 5 is a fragmentary schematic view of a modification of the light mixing system embodying this invention.

In FIG. 5 a modification of the light mixing system shown in FIG. 3 is illustrated. Like reference numerals with a prime sign will be applied to like parts for brevity.

The light module 27' and the diffusion module 29' may be essentially the same as that previously described in the prior embodiment. The mixing module 28' includes a similar axicon lens 51' and fiber optic diffusion means 56' arranged and functioning in the same manner as the prior embodiment. In place of light guide 60 of the prior embodiment a clear, transparent plastic member 100 may interface at 101 with the fiber optic diffuser member 56' to receive the fan or cone shaped pattern of light beams 58' exiting from the face of diffuser means member 56'.

The member 100 may be of generally slightly conical form having an exit face 102 formed by radians lying approximately at 90 degrees to the sides of member 100 and having the central portion of such exit face interrupted by a hollow chamber 103 of conical form extending toward the conical lens 51' and coaxial therewith. The hollow chamber 103 is provided with light reflecting surfaces to radially outwardly reflect light beams received from the exit face of the fiber optic diffuser means 56'. This arrangement reflects some of the light beams received by reflection from the fiber optic diffuser means 56' to the side walls of the member 100 where they are again reflected inwardly. Thus, extensive light mixing occurs in member 100. Light beams emanating from the exit face 102 of member 100 are transmitted through air space to an inverted dome shaped transparent window 105 provided on the diffusion module 20' to protect the interior of the frustoconical chamber 73' thereof.

In this modification, plastic member 100 may substantially reduce the distance between the fiber optic diffuser member exit face and the light inlet opening of the diffusion module 29' and may also eliminate the conventional diffusion plate 62 shown in the prior embodiment.

It will be apparent in both embodiments of the light mixing system of this invention, the combination of the axicon lens and the fiber optic diffuser member provides extensive mixing of received light in a relatively short distance. Such light mixing system is adapted to effectively receive filtered light to facilitate achieving a desired color enlargement. It will be understood that the exit port of the light mixing system of this invention may thus serve as a secondary light source having substantially uniform distribution of light of a selected color temperature.

Any changes and modification of the invention described above coming within the scope of the appended claim are embraced thereby.

I claim:

1. In a light mixing system adapted to receive from a light source, beams of light with non-uniform random energy distribution and to mix said light beams to provide substantially uniform energy distribution at the outlet port of said system, the combination of:
   a lens means having a conical surface to receive said light beams and to direct said light beams each along a path at an angle to the axis of said conical surface;
   a fiber optic diffuser means comprising
   a plurality of fiber optic elements each receiving light beams along said angular path, each element transmitting and reflecting said light beams, and causing each light beam to depart the exit end of said element in the form of an expanding cone of substantially the same angle as that of the light beams at the lens means for mixing said light beams; and
   means for guiding and further mixing said exiting mixed light beams to the outlet port of said mixing system.

2. In a light mixing system as stated in claim 1 wherein a selected angle for the light beam path provided by said lens means is about 45 degrees to the axis of said system.

3. In a mixing system as stated in claim 1 wherein the light beam angle entering the fiber optic diffuser means is in the order of 30 to 40 degrees with respect to said axis.

4. In a light mixing system adapted to receive light from a light source, the combination of:
   a lens means to receive said light and to impart a selected angle to each received light beam upon exit of said beam; and
   means interfacing with said lens means to receive each angularly disposed light beam, to transmit each beam by reflection thereof, and to cause departure of each light beam therefrom in a progressively expanding form for extensively mixing light departing therefrom adjacent the exit face of the interfacing means.

5. A system as stated in claim 4 including light guide means receiving light departing from said interfacing means.

6. In a light mixing system adapted to receive from a light source, beams of light with non-uniform random energy distribution and to mix said light beams to provide substantially uniform energy distribution at the outlet port of said system, the combination of:
   a lens means having a conical surface to receive said light beams and to direct said light beams each along a path at an angle to the axis of said conical surface;
   a fiber optic diffuser means comprising
   a plurality of fiber optic elements each receiving light beams along said angular path, each element transmitting and reflecting said light beams, and causing each light beam to depart the exit end of said element in the form of an expanding cone of substantially the same angle as that of the light beams at the lens means for mixing said light beams;
   means for guiding and further mixing said exiting mixed light beams to the outlet port of said mixing system;
   a second diffuser means at the exit end of said light guiding means; and
   a frustoconical light reflecting chamber adapted to receive light from said second diffuser means and to expand said received light over an enlarged area.

7. In a system as stated in claim 6 including a diffusion means at said expanded area outlet of said second diffuser means.

8. In a light mixing system adapted to receive light from a light source, the combination of:
   a lens means to receive said light and impart a selected angle to each received light beam;
   means interfacing with said lens means to receive each angularly disposed light beam and to cause departure of each light beam therefrom in a progressively expanding form for extensively mixing light departing therefrom; and
   a light guide member having a hollow conical reflecting surface spaced from said interfacing means and reflecting a portion of the light departing said interfacing means.

9. A system as stated in claim 8 wherein
   said light guide member is of conical form and is provided with an entry face at the exit face of said interfacing means and is provided with an exit face adapted to be spaced from a light diffusing means.

10. In a light mixing system adapted to receive from a light source, beams of light and to mix said light beams to provide substantially uniform energy distribution at the outlet port of said system, the combination of:
    a lens means having an entry surface to receive and refract said light beams from said light source and to direct said light beams along converging paths at an angle to the optical axis of said lens means, said lens means having an exit face;
    a diffuser means at said exit face to receive said light beams and including
    a plurality of fiber optic elements with their axes parallel to said optical axis and each receiving light beams along said angular path, each of said elements being cladded and fused to adjacent elements, each fiber optic element causing a light beam to depart the exit end of said element in the form of an expanding cone for mixing and dispersion of light departing the exit face of the diffuser means.

11. A system as stated in claim 10 wherein said fiber optic elements are in the order of 5 to 10 microns in diameter.

12. In a system as stated in claim 10 wherein said diffuser means of fiber optic elements is in the order of 1/16 inch in thickness.

13. In a system as stated in claim 10 including a light guide of transparent plastic material having an entry face at said diffuser means.

14. A system as stated in claim 10 including a frustoconical chamber to receive light exiting from said light guide and adapted to provide a secondary light source for a light diffusing module.

* * * * *

UNITED STATES PATENT AND TRADEMARK OFFICE
CERTIFICATE OF CORRECTION

PATENT NO. : 4,240,738
DATED : December 23, 1980
INVENTOR(S) : Michael F. Praamsma It is certified that error appears in the above—identified patent and that said Letters Patent is hereby corrected as shown below:

Column 3, line 15, change "one" to -- on --.
Column 3, line 20, delete "74".
Column 4, line 6, change "of" 1st. occurrence to -- to --.
Column 4, line 67, delete "74".
Column 4, line 68, change "65" to -- 64 --.
Column 6, line 21, insert -- is -- after "located".

Column 7, line 4, change "20'" to -- 29' --.

Signed and Sealed this

Twenty-sixth Day of January 1982

[SEAL]

Attest:

Attesting Officer

GERALD J. MOSSINGHOFF

Commissioner of Patents and Trademarks